7041X

J. L. Colman,

Wind Wheel,

Patented May 4, 1832

N. PETERS, PHOTO-LITHOGRAPHER, WASHINGTON, D. C.

Jeremiah L. Colman
Letters Patent

The Schedule referred to in these Letters Patent and making part of the
same containing a description in the words of the said Jeremiah L. Colman
himself of his improvement called the self regulating Horizontal Wind
Mill

---

Figure 1:
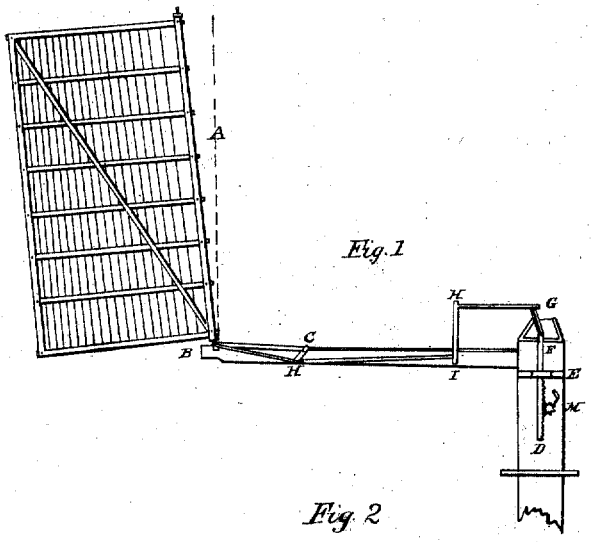

Be it known that I Jeremiah L. Colman of Vincennes of the County of
Knox and State of Indiana have invented a new and useful improvement
in the application of wind to Machinery and that the following is a full and
exact description of the construction and operation of the said machine as invented
by me Termed Gravity on Wind or J. L. Colman's self regulating horizontal
wind mill. for working every kind of Machinery which is propelled by apply
ing Weight on Wind. Figure 1 represents one of the wings or sails stand-
ing inclining to the left or backwards from dotted line A. which throws a weight
of the wing to the left. The inclination may be more or less than represented by
the wing and dotted line agreeable to the natural weight of the wing.
But give it such inclination back from the way which the wind Mill is
calculated to run as will give sufficient weight to drive say one light
run of millstones - if more power is desired and the wind sufficiently strong
add more weight to the wings or give the wings more inclination which
may be effected by hand, stopping the Mill and moving a piece of timber
on which the wings turn, as at B. where said timber moves on a smooth sur-
face turning on a pivot on the arms at C. or the wings may be inclined more
or less without stopping the Mill by the following described Machinery (viz)
By a piece of cast iron with teeth as represented at D. which moves up or
down in a groove in the wind shaft and passes under a cast iron Collar
on the wind shaft as at E. with moving joints at F & G. where it is attach
ed to a triangular frame of wood or iron with a stationary pivot at H.
A piece of timber running from I. where there is another moving joint to
K. where it joins on a triangular as the one above described. by a man
standing on a wheel or platform on wind shaft at L. and turning a small Drawing

Figure 2:
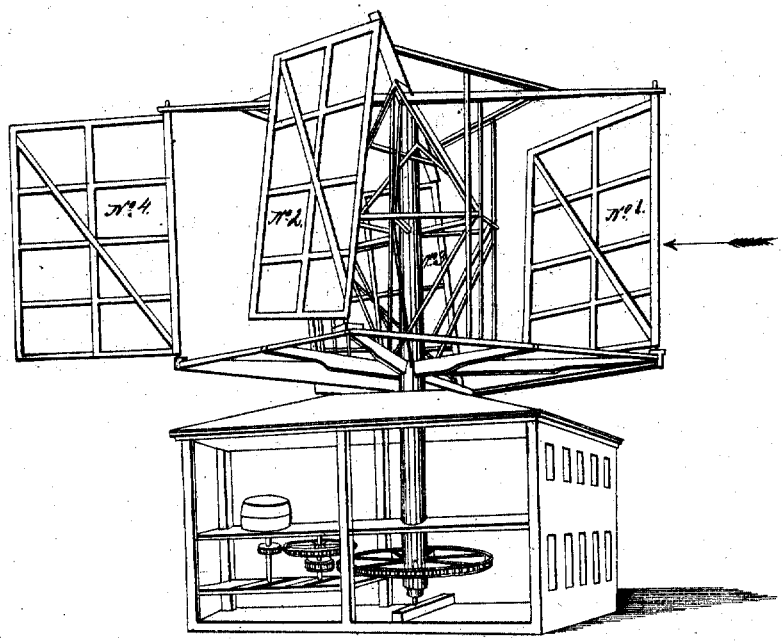

7041X small pinion wheel with a crank at M. The cast iron with teeth sepa-
rated at D. is moved up a screw which moves the lower point of the wind
at B. by the above described machinery be attached thereto by which more or
less power may be given. Figure 2 is a wing of a mill in operation in a [illegible] light
breeze of wind. Wing No 1. receiving the wind on its backside as it
comes from the arrow. Wing No 2 receiving the wind on its back the same
as above. Wing No 3. coming with its thin end to the wind. Wing No 4 re-
ceiving the wind as it comes from the arrow passing in front of wing No 2
and back of wing No 1 which wing stand as a conductor and leaves [illegible]
in front of wing No 4. Each wing performing one revolution on its pivots
to one of main wind wheel if the wind be sufficient. The above described
mill is safe with almost any sized wings, as each wing [illegible] a storm
stands with its thin edge to the wind. the wind having [illegible] little more
power if any than the given weight of the wings on the wind. In stopping
the mill friction levers may be lightly drawn around any of the wheels by a
windlass which will be sufficient to over balance the weight of the wings
above and the mill stops. All the bracing within the wind wheel at N.
in Figure 2 may be dispensed with in a small scale, leaving the centre
post sufficiently large. The running gears may be as in any other mill
geared from a vertical shaft, to suit such machinery as is calculated
to be done. The machinery ought to have its proper speed when the
wings are ~~moving~~ say 5 miles an hour – a little more or a little less will do.
The wings may be covered with light boards or canvass Vincennes March
27 1832,

[illegible] Witnesses
G. W. Johnson
G W Rathbone
(Seal)

Jeremiah L. Colman

[illegible]